(12) United States Patent
Almughanam et al.

(10) Patent No.: US 11,834,618 B1
(45) Date of Patent: Dec. 5, 2023

(54) FLEXIBLE BIOMASS GASIFICATION BASED MULTI-OBJECTIVE ENERGY SYSTEM

(71) Applicant: King Faisal University, Al-Ahsa (SA)

(72) Inventors: Tawfiq Abdul-Aziz Almughanam, Al-Ahsa (SA); Abdul Khaliq, Al-Ahsa (SA)

(73) Assignee: KING FAISAL UNIVERSITY, Al-Ahsa (SA)

(*) Notice: Subject to any disclaimer, the term of this patent is extended or adjusted under 35 U.S.C. 154(b) by 0 days.

(21) Appl. No.: 18/212,373

(22) Filed: Jun. 21, 2023

(51) Int. Cl.
*C10J 3/84* (2006.01)
*F25B 27/02* (2006.01)
*F01D 15/00* (2006.01)
*F02C 6/18* (2006.01)
*F25B 9/00* (2006.01)

(52) U.S. Cl.
CPC ............. *C10J 3/84* (2013.01); *F01D 15/005* (2013.01); *F02C 6/18* (2013.01); *F25B 9/008* (2013.01); *F25B 27/02* (2013.01); *C10J 2300/0916* (2013.01); *C10J 2300/1625* (2013.01); *C10J 2300/1675* (2013.01); *C10J 2300/1861* (2013.01); *F25B 2309/061* (2013.01)

(58) Field of Classification Search
CPC .. F25B 9/08; F25B 9/008; F25B 27/02; F25B 2341/00–0016; C10J 3/84; C10J 2300/0916; C10J 2300/1625; C10J 2300/1675; C10J 2300/1861; F02C 6/18
See application file for complete search history.

(56) References Cited

U.S. PATENT DOCUMENTS

| | | | |
|---|---|---|---|
| 4,682,985 A * | 7/1987 | Kohl | ................... C10J 3/57 48/209 |
| 8,828,122 B2 | 9/2014 | Thacker et al. | |
| 2008/0141672 A1* | 6/2008 | Shah | ................... C10J 3/466 423/220 |
| 2011/0067302 A1* | 3/2011 | Oppenheim | ............. C10K 3/04 62/86 |
| 2013/0283852 A1 | 10/2013 | Sipocz et al. | |
| 2015/0376801 A1 | 12/2015 | Bairamijamal | |
| 2019/0322953 A1 | 10/2019 | Kasseris et al. | |
| 2023/0035251 A1 | 2/2023 | Mennell et al. | |
| 2023/0039174 A1 | 2/2023 | Bromberg et al. | |
| 2023/0287801 A1* | 9/2023 | Fujitomi | ................. F01D 25/00 702/183 |

* cited by examiner

Primary Examiner — Miguel A Diaz
(74) Attorney, Agent, or Firm — Nath, Goldberg & Meyer; Richard C. Litman

(57) ABSTRACT

A system and method for converting biomass to energy in a multi-objective application that includes generating power, heat, and multiple cooling applications. Waste heat from a HCCI engine is used to implement the multiple cooling applications of an ejector refrigeration cycle and a trans-critical refrigeration cycle, process heating, and turbine power production.

9 Claims, 2 Drawing Sheets

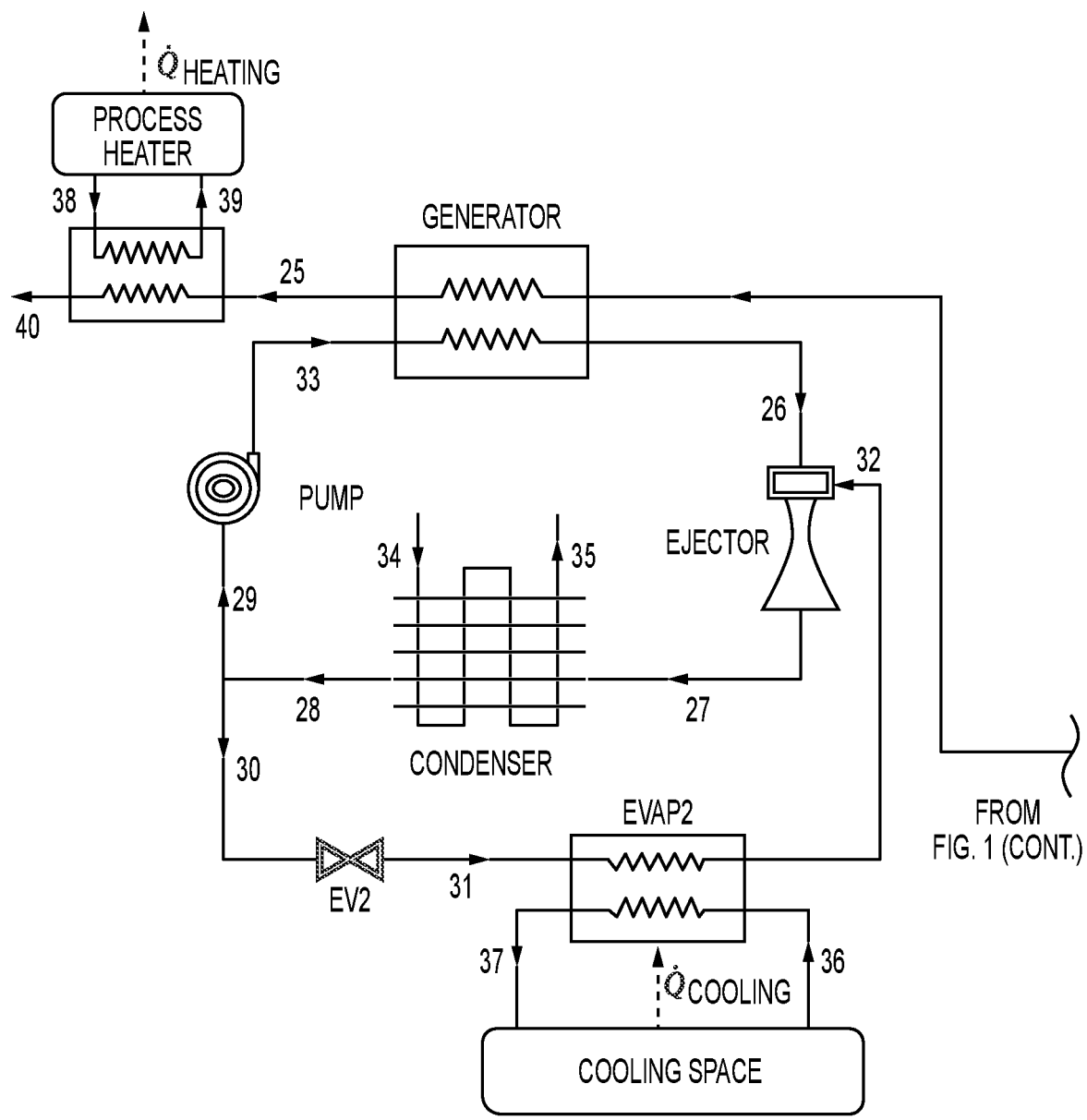

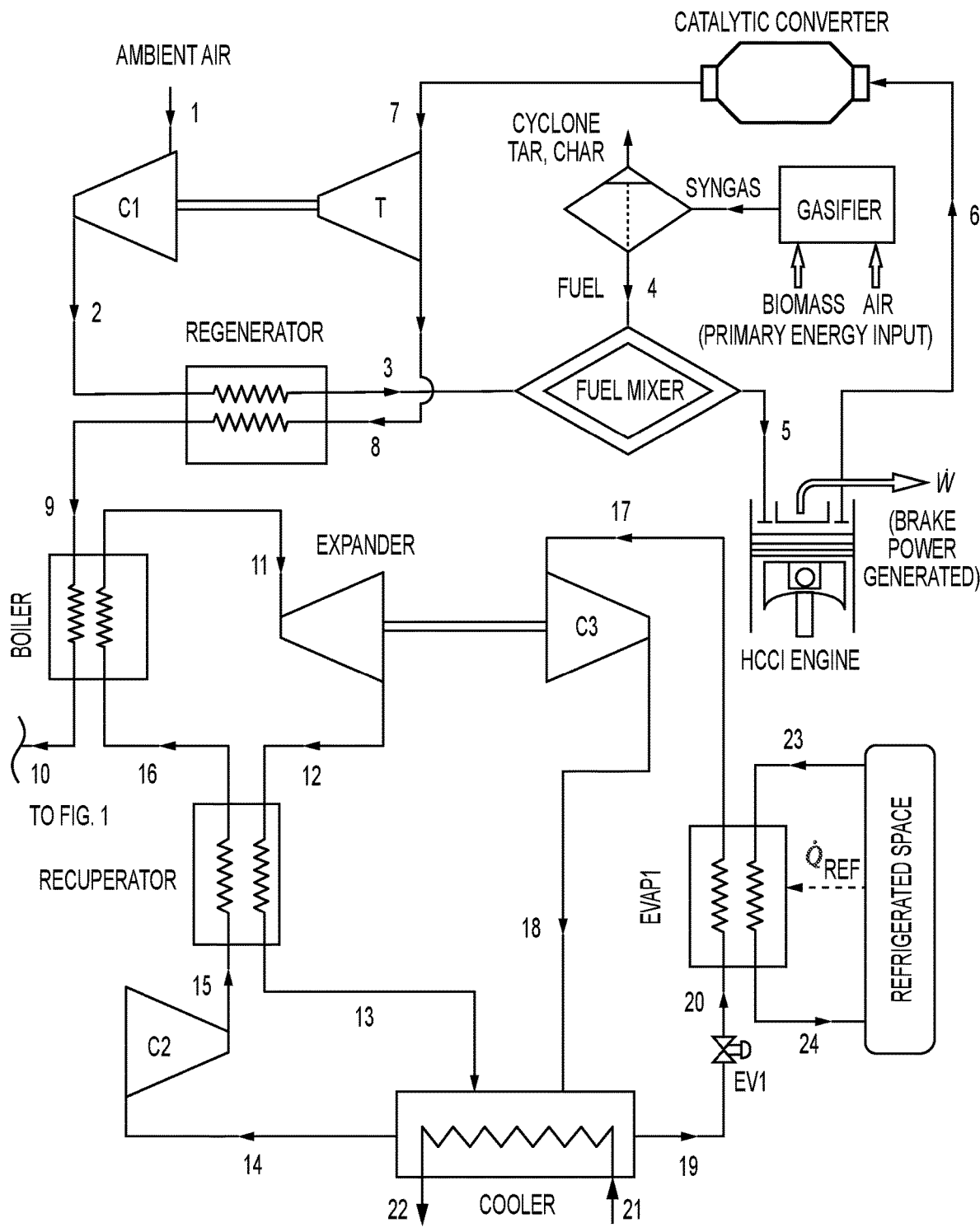

FLEXIBLE BIOMASS GASIFICATION BASED MULTI-OBJECTIVE ENERGY SYSTEM

BACKGROUND

1. Field

The present subject matter is in the technical field of power generation; and more specifically in the technical field of power generation resulting from the gasification of solid fuel with heating and cooling applications.

2. Description of the Related Art

Globally, biomass represents a huge hope for rural electrification and power generation in a sustainable, low cost manner that can trigger economic development based on largely local resources. According to the World Bank, rural electrification can have a profound impact on reducing poverty and improving welfare in the developing world. Another aspect of reducing poverty and improving welfare is reducing food insecurity. Maintenance of the quality of food products through preservation while in transit requires cooling for both refrigeration and air conditioning where the refrigeration is provided for the food products being transported to their destination and the air conditioning is provided for personnel overseeing the deliveries of the food products to their various destinations. Paramount in this task is the need to efficiently provide power for both cooling functions while in transit. Therefore, development of systems that can convert engine waste heat directly into cooling in a plethora of temperature ranges could provide a promising means of effectively meeting the cooling demand of land transportation vehicles.

Producing refrigeration is more expensive than producing heating and power in a majority of applications as it requires refrigeration machinery and a source of electrical power. Therefore, recovery of waste heat from engines for the generation of cooling energy for refrigeration and air conditioning would provide great economic benefits while also furthering energy conservation.

What is needed is a dedicated use of biomass gasification energy in a multi-generation system and method that addresses a plurality of objectives by generating power, heating, cooling, and low temperature refrigeration, simultaneously, which would address the food insecurity issues and help supply different energy needs to a public building such as a multi-suite building, or a neighborhood.

SUMMARY

The present subject matter is directed towards a biomass conversion system and method.

A first aspect of the present subject matter is directed to a biomass conversion system comprising: a syngas gasifier which outputs syngas from an input of biomass and air; a cyclone for receiving the output syngas, removing tar and charcoal from the received syngas, and outputting fuel; a fuel mixer for receiving the output fuel and an input of compressed air and mixing the output fuel and the input of compressed air to generate a mixed stream; a homogenous charge compression ignition engine for receiving the mixed stream, the homogenous charge compression ignition engine generating brake power using the mixed stream and passing homogenous charge compression ignition engine exhaust to a catalytic converter which outputs the homogenous charge compression ignition engine exhaust; a turbine which receives the output homogenous charge compression ignition engine exhaust, generates power to drive a turbocharger, and outputs turbine exhaust; a regenerator which receives the output turbine exhaust and outputs regenerated turbine exhaust; a first compressor which receives power from the turbine and receives an input of ambient air and outputs compressed air to said regenerator; a boiler which receives the output regenerated turbine exhaust, the boiler heating up $CO_2$ and outputting the heated up $CO_2$; an expander that receives the heated up $CO_2$ and produces power; and a second compressor that receives the power from the expander to drive a trans-critical $CO_2$ refrigeration cycle therein to produce cooling in a first cooling temperature range, to produce cooling in a second cooling temperature range, and to output boiler exhaust.

A second aspect of the present subject matter relates to a method which, when implemented, performs the function of providing power, heat, and two types of cooling as a part of the operation cycle of the method.

In this regard, an embodiment of the present subject matter is directed to a biomass conversion method, comprising the steps of: using a gasifier to convert air and biomass into syngas; removing tar and charcoal from the syngas and outputting fuel; receiving the output fuel and compressed air and mixing the output fuel and compressed air to generate a mixed stream; receiving the mixed stream in a homogenous charge compression ignition engine, which generates brake power and engine exhaust, the engine exhaust being sent to a catalytic converter; outputting the engine exhaust from the catalytic converter and inputting the engine exhaust into a turbine; generating power from the turbine to drive a turbocharger and outputting turbine exhaust; receiving the output turbine exhaust and outputting the turbine exhaust to a first compressor; compressing in the first compressor an input of ambient air and outputting compressed air to a regenerator; receiving the output turbine exhaust and heating up $CO_2$, and outputting the heated up $CO_2$; using an expander to produces power from the heated up $CO_2$; and using a trans-critical $CO_2$ refrigeration cycle to produce cooling in a first cooling temperature range, to produce cooling in a second cooling temperature range, and to output boiler exhaust.

These and other features of the present subject matter will become readily apparent upon further review of the following specification.

BRIEF DESCRIPTION OF THE DRAWINGS

FIG. 1 is a diagram of biomass gasification conversion system.

DETAILED DESCRIPTION OF EMBODIMENTS

The following detailed description is merely exemplary in nature and is not intended to limit the described embodiments or the application and uses of the described embodiments. Any implementation described herein with the words "exemplary" or "illustrative" is not necessarily construed as preferred or advantageous over other implementations. All of the implementations described below are exemplary implementations provided to enable persons skilled in the art to make or use the embodiments of the disclosure and are not intended to limit the scope of the disclosure, which is defined by the claims. For the purposes of the description herein, there is no intention to be bound by any expressed or implied theory presented in the preceding technical field, background, brief summary or the following detailed description. It is also to be understood that the specific devices, systems, and processes illustrated in the attached drawings, and described in the following specification, are simply exemplary embodiments of the inventive concepts defined in the appended claims. Hence, specific dimensions and other physical characteristics relating to the embodiments disclosed therein are not to be considered as limiting, unless the claims expressly state otherwise.

FIG. 1 depicts a biomass conversion system which includes a syngas gasifier (FIG. 1, GASIFIER) which provides syngas to a fuel mixer from an input of biomass and air (FIG. 1, BIOMASS and AIR input arrows) and outputs a biofuel of syngas to a cyclone. The cyclone (FIG. 1, CYCLONE) removes tar and charcoal impurities from the syngas, which syngas is then output as fuel (4) to a fuel mixer (FIG. 1, FUEL MIXER). The fuel mixer receives the output fuel (4) and an input of compressed air (3) from a regenerator (FIG. 1, REGENERATOR) and mixes the output fuel (4) and compressed air (3) before supplying a mixed fuel stream (5) to a homogenous charge compression ignition (HCCI) engine (FIG. 1, HCCI ENGINE). The homogenous charge compression ignition (HCCI) engine generates brake power (FIG. 1, W) and transfers engine exhaust to a catalytic converter (FIG. 1, CATALYTIC CONVERTER), which engine exhaust then travels from the catalytic converter to a turbine (FIG. 1, T); the turbine generating power to drive a turbocharger and outputting turbine exhaust (8) to a regenerator (FIG. 1, REGENERATOR) which in turn outputs exhaust (9) to a boiler (FIG. 1, BOILER). The boiler heats up $CO_2$ (11) which heated $CO_2$ then enters an expander (FIG. 1, EXPANDER) that produces power to drive a compressor (FIG. 1, C3) of a trans-critical $CO_2$ refrigeration cycle that produces cooling in a deep freezing (i.e., low temperature) range (FIG. 1, REFRIGERATED SPACE) which is facilitated by an evaporator (FIG. 1, EVAP1). The evaporator is connected (19), (20) to a cooler (FIG. 1, COOLER) and has a controllable expansion valve (FIG. 1, EV1) between the evaporator and the cooler that creates a drop in pressure between the cooler and the evaporator. The trans-critical $CO_2$ refrigeration cycle is completed using the output (14) from the cooler (FIG. 1, COOLER) which is delivered to a second compressor (FIG. 1, C2), the output of which is input (15) into a recuperator (FIG. 1, RECUPERATOR) and an output (16) from the recuperator (FIG. 1, RECUPERATOR) is fed back into the boiler (FIG. 1, BOILER). The expander (FIG. 1, EXPANDER) is also connected (12) to the recuperator (FIG. 1, RECUPERATOR), which itself is further connected (13) to the cooler (FIG. 1, COOLER) such that the cooler (FIG. 1, COOLER) can provide air conditioning (21, 22) as needed.

The boiler exhaust (10) is used to provide additional refrigeration by means of an ejector refrigeration cycle. The boiler exhaust (10) enters a generator (FIG. 1, GENERATOR) which in turn provides power for driving the ejector refrigeration cycle. The ejector (FIG. 1, EJECTOR) takes the place of a compressor to pressurize the refrigerant vapor flowing (32) from a second evaporator (FIG. 1, EVAP2) and discharges it (27) to a condenser (FIG. 1, CONDENSER).

The system implementing the ejector refrigeration cycle has two loops, a power loop, and a refrigeration loop. In the power loop, low-grade heat is used by the generator (FIG. 1, GENERATOR) to evaporate a high-pressure liquid refrigerant. The high pressure vapor generated, known as the primary fluid (26), flows the ejector (FIG. 1, EJECTOR) where it accelerates through the ejector nozzle. A reduction in pressure induces vapor from the second evaporator (FIG. 1, EVAP2), which is known as the secondary fluid (32). The two fluids (26), (32) mix in a mixing chamber of the ejector before entering the diffuser section where the flow decelerates and pressure recovery occurs. The mixed fluid then flows (27) to the condenser (FIG. 1, CONDENSER), where it is condensed, thereby ejecting heat (35) to the environment. A portion (29) of the liquid (28) exiting the condenser (FIG. 1, CONDENSER) is then pumped using a pump (FIG. 1, PUMP) to the generator (FIG. 1, GENERATOR). The remainder (30) of the liquid (28) is expanded through a second expansion valve device (FIG. 1, EV2) and enters the second evaporator (FIG. 1, EVAP2) of the refrigeration loop at this point as a mixture of liquid and vapor. The refrigerant evaporates in the second evaporator (FIG. 1, EVAP2), thereby producing a refrigeration effect for the food cooling space (FIG. 1, COOLING SPACE) and the resulting vapor (32) is then drawn back into the ejector (FIG. 1, EJECTOR) and reconstituted as discussed above. The generator (FIG. 1, GENERATOR) also produces an outlet of heat (25) that enters a process heater (FIG. 1, PROCESS HEATER) to provide heat (39) for heating water and producing hot water.

The methods as described herein relate to a combined use of produced syngas and HCCI engine exhaust to produce power from a turbine for a turbocharger and execute a trans-critical $CO_2$ refrigeration cycle with two cooling temperature ranges; and in conjunction also using boiler exhaust to power an ejector refrigeration cycle for a cooling space for food and to provide process heating for heating hot water.

It is to be understood that the biomass energy conversion system and method are not limited to the specific embodiments described above but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:
1. A biomass conversion system comprising:
    a syngas gasifier which outputs syngas from an input of biomass and air;
    a cyclone for receiving the output syngas, removing tar and charcoal from the received syngas, and outputting fuel;
    a fuel mixer for receiving the output fuel and an input of compressed air and mixing the output fuel and the input of compressed air to generate a mixed stream;
    a homogenous charge compression ignition engine for receiving the mixed stream, the homogenous charge compression ignition engine generating brake power using the mixed stream and passing homogenous charge compression ignition engine exhaust to a catalytic converter which outputs the homogenous charge compression ignition engine exhaust;
    a turbine which receives the output homogenous charge compression ignition engine exhaust, generates power to drive a turbocharger, and outputs turbine exhaust;
    a regenerator which receives the output turbine exhaust and outputs regenerated turbine exhaust;
    a first compressor which receives power from the turbine and receives an input of ambient air and outputs the compressed air to said regenerator;
    a boiler which receives the output regenerated turbine exhaust, the boiler heating up $CO_2$ and outputting the heated up $CO_2$;

an expander that receives the heated up $CO_2$ and produces power; and a second compressor that receives the power from the expander to drive a trans-critical $CO_2$ refrigeration cycle therein to produce cooling in a first cooling temperature range, to produce cooling in a second cooling temperature range, and to output boiler exhaust.

2. The biomass conversion system as recited in claim 1, wherein exhaust from the boiler enters a generator of an ejector refrigeration cycle which produces cooling for food products, the generator producing an outlet of heat that enters a process heater to provide heat for heating water and producing hot water.

3. The biomass conversion system as recited in claim 2, wherein the ejector refrigeration cycle which produces cooling for food products further comprises:
   an ejector coupled to said generator;
   a condenser coupled to said ejector; and
   a pump coupled to said condenser.

4. The biomass conversion system as recited in claim 3, wherein the second compressor is coupled to a cooler, said cooler providing said second cooling temperature range.

5. The biomass conversion system as recited in claim 4, wherein said cooler providing said second cooling temperature range is coupled to a first expansion valve.

6. The biomass conversion system as recited in claim 5, wherein said first expansion valve is coupled to a first evaporator.

7. The biomass conversion system as recited in claim 6, wherein said first evaporator provides said first cooling temperature range, which is lower than said second cooling temperature range.

8. The biomass conversion system as recited in claim 7, wherein the ejector refrigeration cycle which produces cooling for food products further comprises:
   a second expansion valve coupled to the condenser; and
   a second evaporator coupled to the second expansion valve, wherein the second evaporator provides a cooling space.

9. A biomass conversion method, comprising the steps of:
   using a gasifier to convert air and biomass into syngas;
   removing tar and charcoal from the syngas and outputting fuel;
   receiving the output fuel and compressed air and mixing the output fuel and compressed air to generate a mixed stream;
   receiving the mixed stream in a homogenous charge compression ignition engine, which generates brake power and engine exhaust, the engine exhaust being sent to a catalytic converter;
   outputting the engine exhaust from the catalytic converter and inputting the engine exhaust into a turbine;
   generating power from the turbine to drive a turbocharger and outputting turbine exhaust;
   receiving the output turbine exhaust and outputting the turbine exhaust to a regenerator;
   compressing in the first compressor an input of ambient air and outputting compressed air to the regenerator;
   receiving the output turbine exhaust and heating up $CO_2$, and outputting the heated up $CO_2$;
   using an expander to produces power from the heated up $CO_2$; and
   using a trans-critical $CO_2$ refrigeration cycle to produce cooling in a first cooling temperature range, to produce cooling in a second cooling temperature range, and to output boiler exhaust.

\* \* \* \* \*